United States Patent
Housley

(10) Patent No.: US 10,758,089 B2
(45) Date of Patent: Sep. 1, 2020

(54) COLLAPSIBLE STORAGE APPARATUS

(71) Applicant: Todd B. Housley, McKinney, TX (US)

(72) Inventor: Todd B. Housley, McKinney, TX (US)

( * ) Notice: Subject to any disclaimer, the term of this patent is extended or adjusted under 35 U.S.C. 154(b) by 0 days.

(21) Appl. No.: 15/423,369

(22) Filed: Feb. 2, 2017

(65) Prior Publication Data

US 2017/0215651 A1  Aug. 3, 2017

Related U.S. Application Data

(60) Provisional application No. 62/290,147, filed on Feb. 2, 2016.

(51) Int. Cl.
  *A47J 47/20* (2019.01)
(52) U.S. Cl.
  CPC ..................... *A47J 47/20* (2013.01)
(58) Field of Classification Search
  CPC .. A47J 47/16; A47J 47/20; A47J 43/22; A47J 43/24; A47K 1/09
  USPC .............................. 4/290, 292, 654, 656–657
  See application file for complete search history.

(56) References Cited

U.S. PATENT DOCUMENTS

| | | | |
|---|---|---|---|
| 160,540 A | 3/1875 | Murdock | |
| 832,309 A * | 10/1906 | Frey | A47J 47/20 4/290 |
| 948,954 A * | 2/1910 | Cody | A47J 47/20 4/290 |
| 981,448 A | 1/1911 | Matthews | |
| 1,225,308 A * | 5/1917 | Born | A47J 47/20 4/290 |
| 2,309,851 A * | 2/1943 | Kuhne | A47J 47/20 211/85.25 |
| 2,691,237 A | 10/1954 | Hawley | |
| 3,625,162 A | 12/1971 | Crew | |
| 3,742,965 A * | 7/1973 | Hudziak | A47L 17/02 134/115 R |
| 4,033,461 A | 7/1977 | Nevai | |
| 4,069,994 A * | 1/1978 | Wharmby | B65B 67/125 248/101 |
| 4,456,021 A | 6/1984 | Leavens | |
| 5,002,245 A * | 3/1991 | Hansen | B65B 67/125 248/101 |
| D324,902 S | 3/1992 | Kohler, Jr. et al. | |
| 5,181,285 A | 1/1993 | Kolada | |
| 5,217,123 A | 6/1993 | Riley et al. | |
| D338,261 S | 8/1993 | Kolada | |

(Continued)

FOREIGN PATENT DOCUMENTS

| | | |
|---|---|---|
| EP | 1442691 A1 | 8/2004 |
| JP | 2003020707 A | 1/2003 |
| JP | 2010035749 A | 2/2010 |

OTHER PUBLICATIONS

Power Lock Suction SinkWorks Sponge and Scrubber Combo found at http://www.amazon.com/Rubbermaid-1G15M6FRST-Evolution-Divider-Frost/dp/B000IZANR2.

(Continued)

*Primary Examiner* — Jeremy Carroll
(74) *Attorney, Agent, or Firm* — Foley & Lardner LLP

(57) ABSTRACT

A collapsible storage apparatus is provided. Articles may be placed in the apparatus for draining, drying, washing, and the like. The apparatus may be opened for use, and may be collapsed for storage in place. The apparatus is joinable to a nearby surface, for instance, an interior surface of a sink, facilitating ready use and positioning.

13 Claims, 14 Drawing Sheets

(56) References Cited

U.S. PATENT DOCUMENTS

| | | |
|---|---|---|
| 5,279,007 A | 1/1994 | Kolada |
| 5,590,804 A | 1/1997 | Crum et al. |
| 5,715,547 A | 2/1998 | Becker et al. |
| 5,823,366 A | 10/1998 | Bellamy |
| 5,865,325 A | 2/1999 | Comstock |
| 6,039,887 A | 3/2000 | Licari |
| 6,276,675 B1 | 8/2001 | Shamoon |
| 6,341,704 B1 | 1/2002 | Michel, Jr. |
| 6,508,368 B1 | 1/2003 | Arce, Jr. |
| 6,547,080 B1 | 4/2003 | Guard |
| 6,698,464 B2 | 3/2004 | Hennemann, Jr. et al. |
| 6,783,674 B2 | 8/2004 | Iannizzotto et al. |
| 6,904,647 B2 * | 6/2005 | Byers, Jr. ............... A45C 13/10 24/30.5 R |
| D534,024 S * | 12/2006 | Dretzka ............... D6/567 |
| D549,528 S * | 8/2007 | Elson ............... D7/677 |
| D558,535 S | 1/2008 | Curtin |
| D558,538 S | 1/2008 | Curtin |
| D595,914 S | 7/2009 | Housley |
| 7,678,271 B2 | 3/2010 | Curtin |
| 8,387,783 B2 * | 3/2013 | Zack ............... A47K 3/001 206/77.1 |
| D699,972 S * | 2/2014 | Lee ............... D6/553 |
| 8,801,926 B2 | 8/2014 | Housley |
| 2002/0043535 A1 * | 4/2002 | Immerman ............... A47G 3/00 220/483 |
| 2004/0250345 A1 | 12/2004 | Kaster |
| 2008/0230462 A1 | 9/2008 | Curtin |
| 2010/0251906 A1 | 10/2010 | Repp et al. |
| 2014/0245533 A1 * | 9/2014 | Lee ............... A47J 47/20 4/630 |
| 2014/0346102 A1 * | 11/2014 | Housley ............... A47J 43/24 210/232 |
| 2014/0352054 A1 * | 12/2014 | Tollasepp ............... A47J 47/20 4/654 |

OTHER PUBLICATIONS

Clear Saddlebag Sink Tray/Basket found at http://www.hangercity.com/sador.html.
Simplehuman Sink Caddy, Stainless Steel found at http://www.amazon.com/Simplehuman-Sink-Caddy-Stainless-Steel/dp/B002WGHKWQ/ref=pd_sbs_hg_21.
OXO Good Grips Suction Large Basket found at http://www.amazon.com/Oxo-Grips-1213400-Suction-Basket/dp/B00179DLWC/ref=pd_sbs_hg_52.
Rubbermaid Evolution Snk Divider Mat found at http://www.amazon.com/Rubbermaid-1G15M6FRST-Evolution-Divider-Frost/dp/B000IZANR2.
Adjustable Dish Brush and Spong Holder found at http://www.amazon.com/Adjustable-Dish-Brush-Sponge-Holder/dp/B001YHTWFC/ref=pd_sbs_hg_29.
Flat Fold Colander found at http://www.aliexpress.com/product-fm/334191129-Flat-Fold-Colander-Folding-colander-as-seen-on-tv-items-with-free-shipping-wholesalers.html.
International Search Report for Co-Pending PCT Application No. PCT/US2011/049457 dated Mar. 26, 2012.
Written Opinion dated Mar. 14, 2013 in corresponding application No. PCT/US2011/049457.

* cited by examiner

COLLAPSIBLE STORAGE APPARATUS

CROSS REFERENCE TO RELATED APPLICATIONS

This application claims priority to U.S. provisional patent application Ser. No. 62/290,147 entitled "TOOL CADDY FOR SINK", filed Feb. 2, 2016, which is hereby incorporated by reference in its entirety for all purposes.

BACKGROUND

In-sink storage containers are oftentimes used to hold brushes, sponges, utensils and similar items around a kitchen sink area. For example, after using a sponge to clean dirty dishes, instead placing the sponge on the bottom of the sink until the next use, the sponge can be placed in a storage container, which is oftentimes mounted or otherwise placed inside of the sink. However, such items are oftentimes bulky and consume large amounts of space. When the storage container is not necessary, it must be manually moved out of the sink and placed either on the counter, thereby contaminating the countertop, or placed in the dishwasher machine.

SUMMARY

A collapsible storage apparatus is provided. The collapsible storage apparatus may include a rear wall portion including an attachment mechanism configured to attach to a sink. The collapsible storage apparatus may also include a protruding wall portion opposing the rear wall portion and movable between an open position and a closed position. In response to the protruding wall portion being in the open position, the rear wall and protruding wall may define a draining cavity configured to receive an article. The collapsible storage apparatus may also have a hinge portion joining the rear wall portion to the protruding wall portion.

A collapsible storage apparatus is provided. The collapsible storage apparatus may have a rear wall portion with a curved nesting panel and an attachment mechanism configured to connect the curved nesting panel to a curved surface, and a hinge portion joining the rear wall portion to a protruding wall portion opposite the rear wall portion. The protruding wall portion may have a structural panel having a convex curvature, a drip accumulator having a flared lip extending upwardly from the structural panel and curving outwardly away from the structural panel, and a drain panel. The drain panel may include a compoundly curved panel extending from an opposite end of the structural panel from the drip accumulator and attached to the hinge portion.

A further collapsible colander and storage apparatus is discussed. The collapsible storage apparatus may have a rear wall portion with a planar nesting panel and an attachment mechanism configured to attach the planar nesting panel to a planar surface, and a hinge portion including an accordion structure joining the rear wall portion to a protruding wall portion opposite the rear wall portion. The he rear wall portion and protruding wall portion may define at least a portion of the perimeter of a draining cavity. The protruding wall portion may have a structural panel, a pull tab extending from the structural panel and configured to be gripped, and a drain panel. The drain panel may be a triangular panel connected to the structural panel with apertures defined through the drain panel and in fluidic communication with the draining cavity.

The accordion structure may have various features. For instance, the accordion structure may have a first side inward collapsible flap joined at an edge to the rear wall portion, a first side outward collapsible flap joined at an edge to the protruding wall portion and joined at an opposing edge to the first side inward collapsible flap, a first magnet disposed on the first side inward collapsible flap, and a second magnet disposed on the second side inward collapsible flap. The magnets may be selectably connectable.

DETAILED DESCRIPTION

Figure 1A:
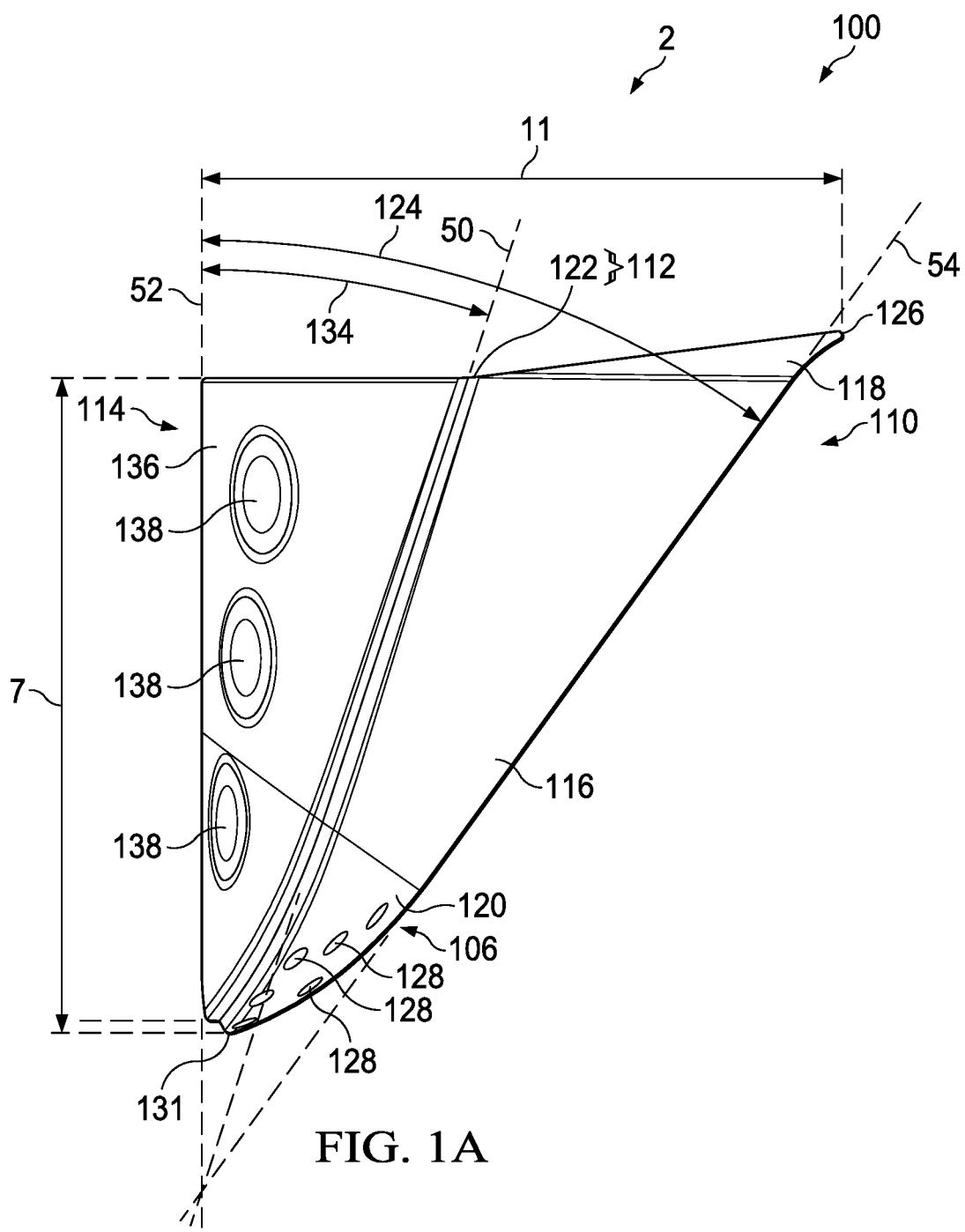
FIGS. 1A-B are diagrams of a collapsible storage apparatus configured for installation in a corner of a sink.

In the description which follows, like parts are marked throughout the specification and drawings with the same reference numerals, respectively. The drawings are not necessarily to scale and certain features may be shown exaggerated in scale or in somewhat schematic form in the interest of clarity and conciseness.

A collapsible storage apparatus may be advantageously used to store articles, such as, for example, while they are drying, to wash articles, such as culinary utensils, and to facilitate the washing of food, for instance, to rinse vegetables. In use, the collapsible storage apparatus may be releasably attached to a surface, such as for example, a sidewall of a sink, and positionable between an open position for use, and a closed position for storage so as to provide unobstructed access to the sink area. In addition, while the collapsible storage apparatus is discussed with reference to a sink in the paragraphs below, it should be understood that the collapsible storage apparatus may be used in other environments, such as, for example, in a bathtub or a shower area.

Figure 13:
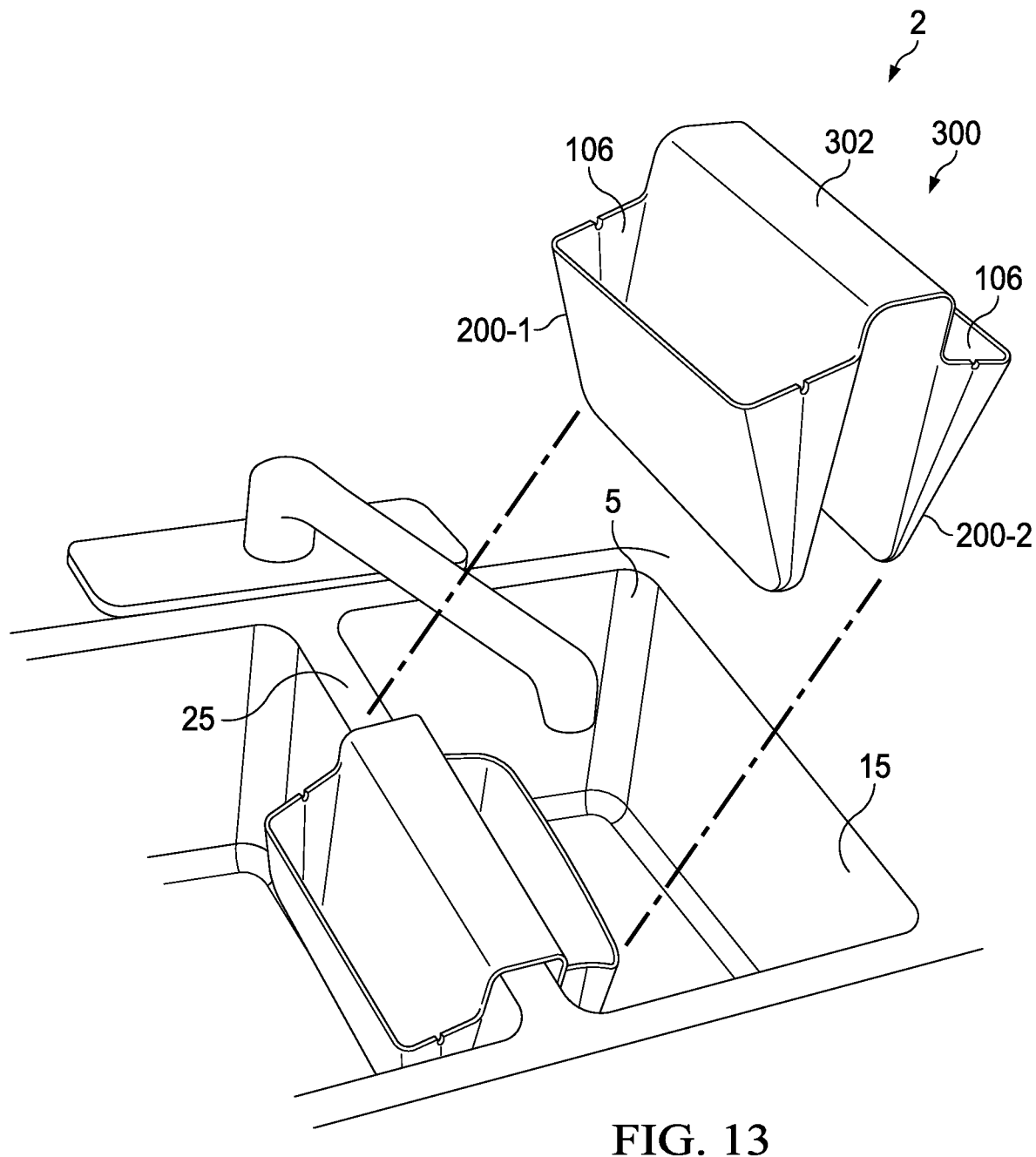

With reference to FIG. 1A through FIG. 5B, a collapsible storage apparatus 2 may comprise a corner pocket storage apparatus 100. A corner pocket storage apparatus 100 selectably attaches to an interior corner of a sink, a basin, or to any curved surface as desired. For example, in some embodiments, the corner pocket storage apparatus 100 is selectably attached to a corner area of a sink 5 (FIG. 13), and an article 3 (FIG. 2), such as a scrubbing brush, may be placed in a storage or draining cavity 106 of the apparatus 100 for ready access, rinsing and drying.

According to some embodiments, the collapsible storage apparatus 2 may be placed in various positions relative to a sink, basin, or other surface other than a corner. For instance, with reference to FIGS. 6-10, a collapsible storage apparatus 2 may comprise a side pocket storage apparatus 200. A side pocket storage apparatus 200 selectably attaches to an interior side of a sink, a basin or to any linear surface as desired. Thus one may appreciate that while a corner pocket storage apparatus 100 attaches to a curved surface, a side pocket storage apparatus 200 attaches to a flat surface. In use, articles or objects may be placed in a draining cavity 106 of the side pocket storage apparatus 200 for ready access, rinsing and drying.

Figure 11:
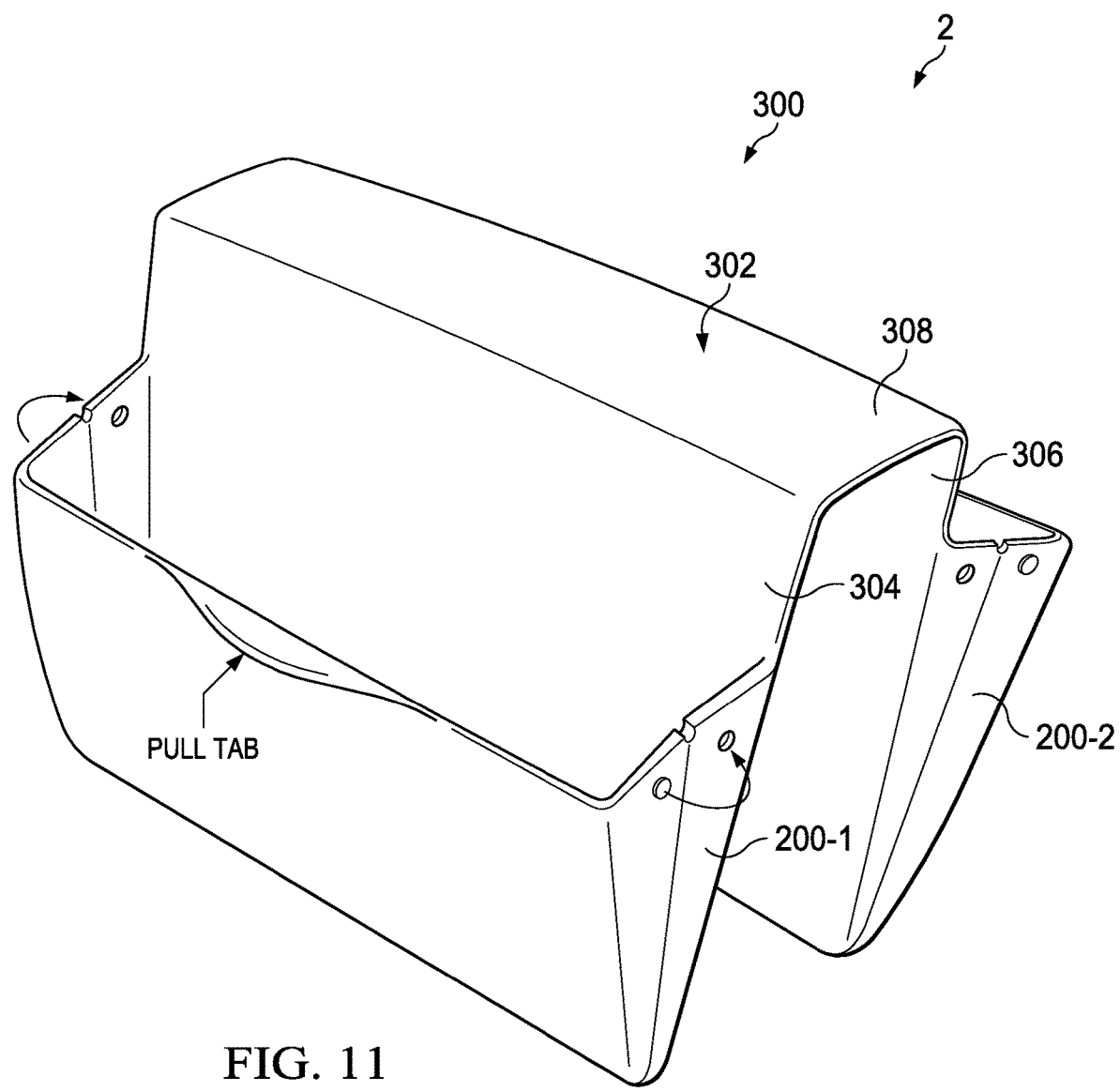
FIGS. 11-13 are diagrams of another embodiment of a collapsible storage apparatus, the apparatus configured for installation over a center divider of a sink.
Figure 12:
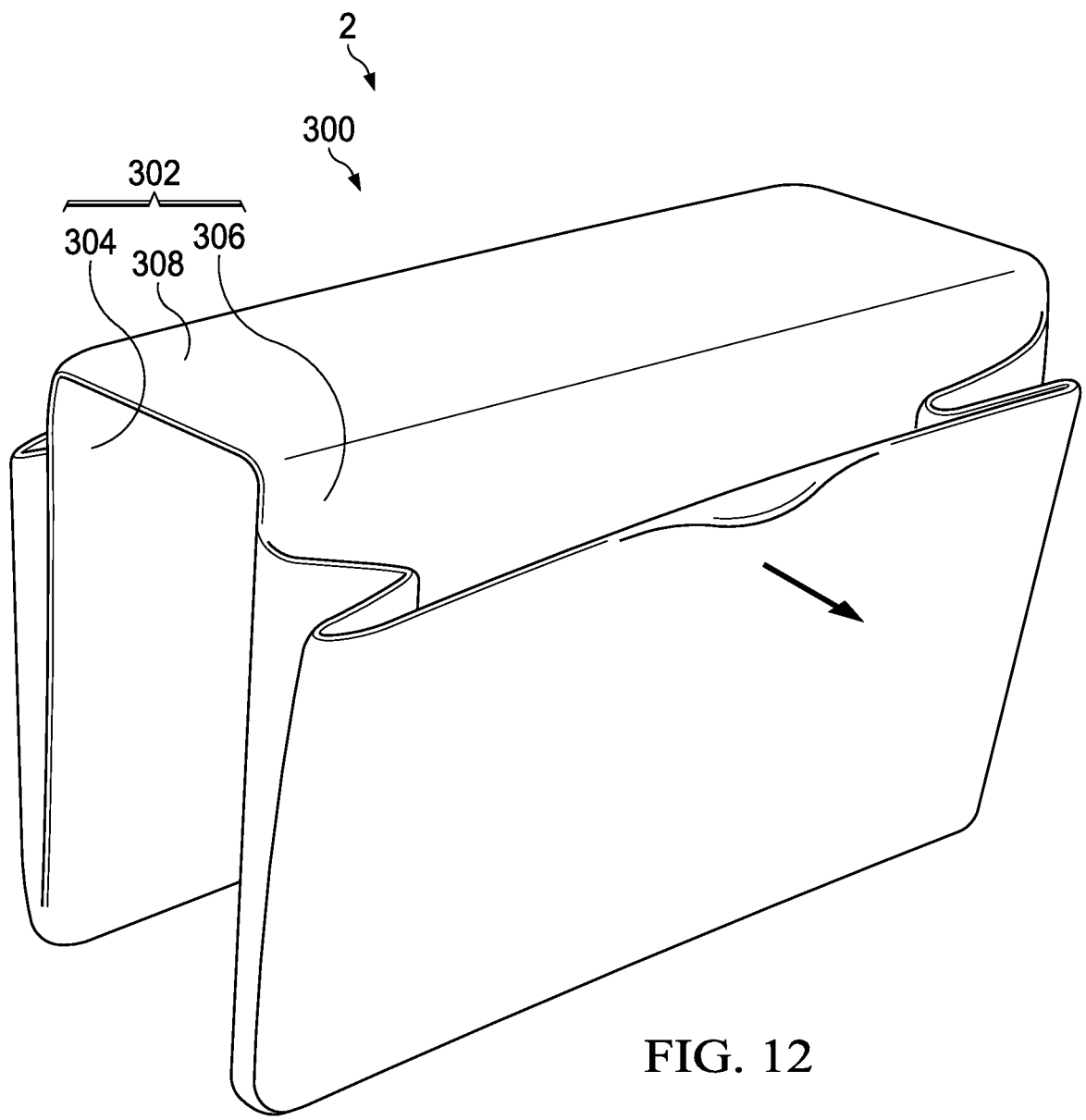

According to some embodiments, the collapsible storage apparatus 2 may be placed in still further positions relative to a sink, basin, or other surface other than a corner. For example, referring to FIGS. 11-13, and with ongoing reference to FIGS. 6-10, the collapsible storage apparatus 2 may comprise a center pocket storage apparatus 300. The center pocket storage apparatus 300 may be placed in positions relative to a sink, basin, or other surface, such as a cross member of the sink dividing different basin portions of the sink from one another. The center pocket storage apparatus 300 may slip over and be otherwise supported by the cross member via a saddle portion 302, which connects separate draining cavities 106. In the embodiment illustrated in FIGS. 12 and 13, for example, separate draining cavities 106 may be positioned on separate sides of the saddle 302. In still further instances, a center pocket storage apparatus 300 may have a draining cavity 106 on only one side of the saddle 302 and thus, the cross member of the sink, basin, or the like.

Corner Pocket Storage Apparatus

Figure 5A:
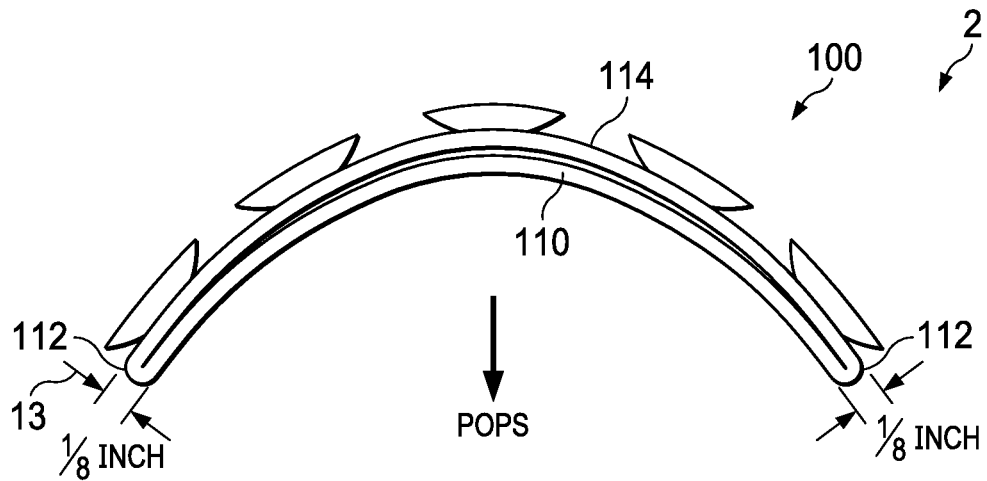
FIG. 5A is a diagram of a collapsible storage apparatus positioned in a closed or stored configuration.
Figure 5B:
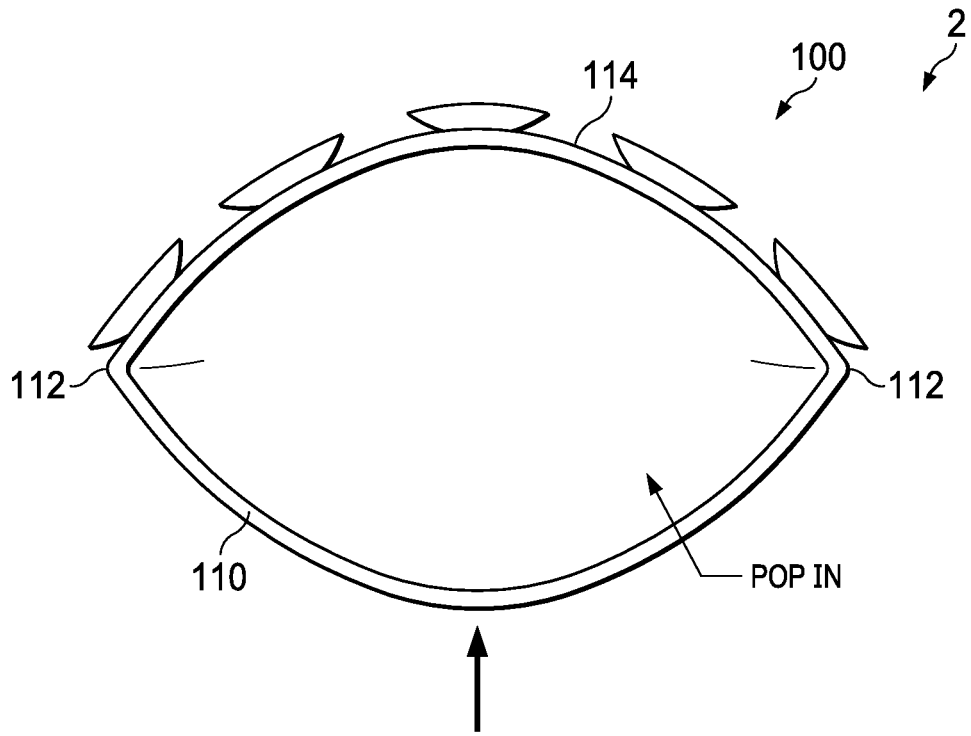
FIG. 5B is a diagram of the collapsible storage apparatus of FIG. 5A positioned in an opened configuration.

Having now broadly discussed various non-limiting example embodiments of the collapsible storage apparatus 2, specific reference is made to FIGS. 1A through 5B for a discussion of various aspects of the corner pocket storage apparatus 100. According to some embodiments, the corner pocket storage apparatus 100 comprises a protruding or front wall portion 110 joined to a rear wall portion 114 by a hinge portion 112. As illustrated in the embodiment provided in FIGS. 1A through 5B, the protruding wall portion 110 extends away from the surface to which the corner pocket storage apparatus 100 is selectably attached. The rear wall portion 114 may be oriented proximate to the surface to which the corner pocket storage apparatus 100 is selectably attached. For instance, referring specifically to FIG. 2, a protruding wall portion 110 may extend away from the surface of the corner area of a sink 5 to which the corner pocket storage apparatus 100 is selectably attached. Similarly, the rear wall portion 114 may be oriented proximate to the surface of the corner area of the sink 5 to which the corner pocket storage apparatus 100 is selectably attached. Thus, the protruding wall portion 110 is opposing the rear wall portion 114. Referring to FIGS. 5A and 5B, one may see that the protruding wall portion 110 may be selectably moved from an open, or protruding position (FIG. 5A) to a closed, or stored position (FIG. 5B) by operation of the hinge portion 112.

According to some embodiments, the protruding wall portion 110 is formed of a resilient and at least partially pliable structure configured to retain an article within the draining cavity 106. In various embodiments the protruding wall portion 110 comprises a planar sheet that has been curved. In further embodiments, the protruding wall portion 110 comprises a compoundly curved sheet. Moreover, the protruding wall portion 110 may have a first protruding wall material stiffness.

According to some embodiments, the rear wall portion 114 may comprise a resilient and at least partially pliable material configured to retain an article within the draining cavity 106. In various embodiments, the rear wall portion 114 comprises a planar sheet that has been curved. In further embodiments, the rear wall portion 114 comprises a compoundly curved sheet. Moreover, the rear wall portion 114 may have a first rear wall material stiffness. In some embodiments, the protruding wall portion 110 is formed of the same material as the rear wall portion 114; however, it should be understood that walls 110 and 114 may be formed of different materials, such as for example, a mesh material.

According to some embodiments, the hinge portion 112 comprises a resilient and at least partially pliable material joining the protruding wall portion 110 to the rear wall portion 114 to enable movement of the protruding wall portion 110 relative to the rear wall portion 114. In various embodiments, the hinge portion 112 has a first hinge portion material stiffness. In various instances, the first hinge portion material stiffness is less (e.g., more pliable) than the first protruding wall material stiffness. In further embodiments, the first hinge portion material stiffness is the same and/or greater than (e.g., less pliable) than the first protruding wall material stiffness. However, the hinge portion 112 may include scoring, bending, localized thinning, stippling, and/or force concentrating features, whereby the hinge portion 112 is operable so that the protruding wall portion 110 articulates relative to the rear wall portion 114.

Turning now with detailed reference to the protruding wall portion 110 introduced above, the protruding wall portion 110 may comprise a structural panel 116, an optional drip accumulator 118, and a drain panel 120. The structural panel 116 comprises a resilient pliable material configured to retain an article within the draining cavity 106. The structural panel 116 is bound at each side by the hinge portion 112, connecting thereto, and bound at a lower end by a drain panel 120, and the upper end by a drip accumulator 118. In various embodiments, the structural panel 116 provides structural rigidity to the protruding wall portion 110.

Figure 1B:
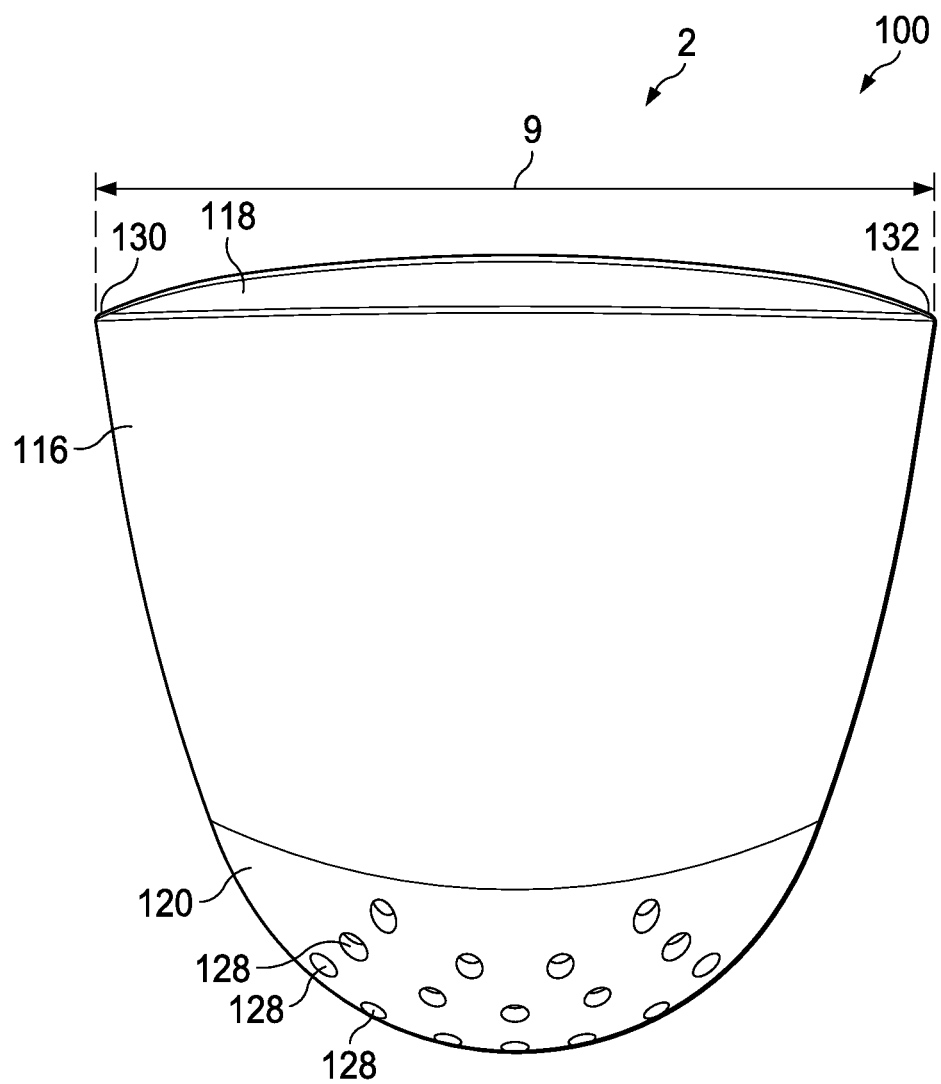
Figure 2:
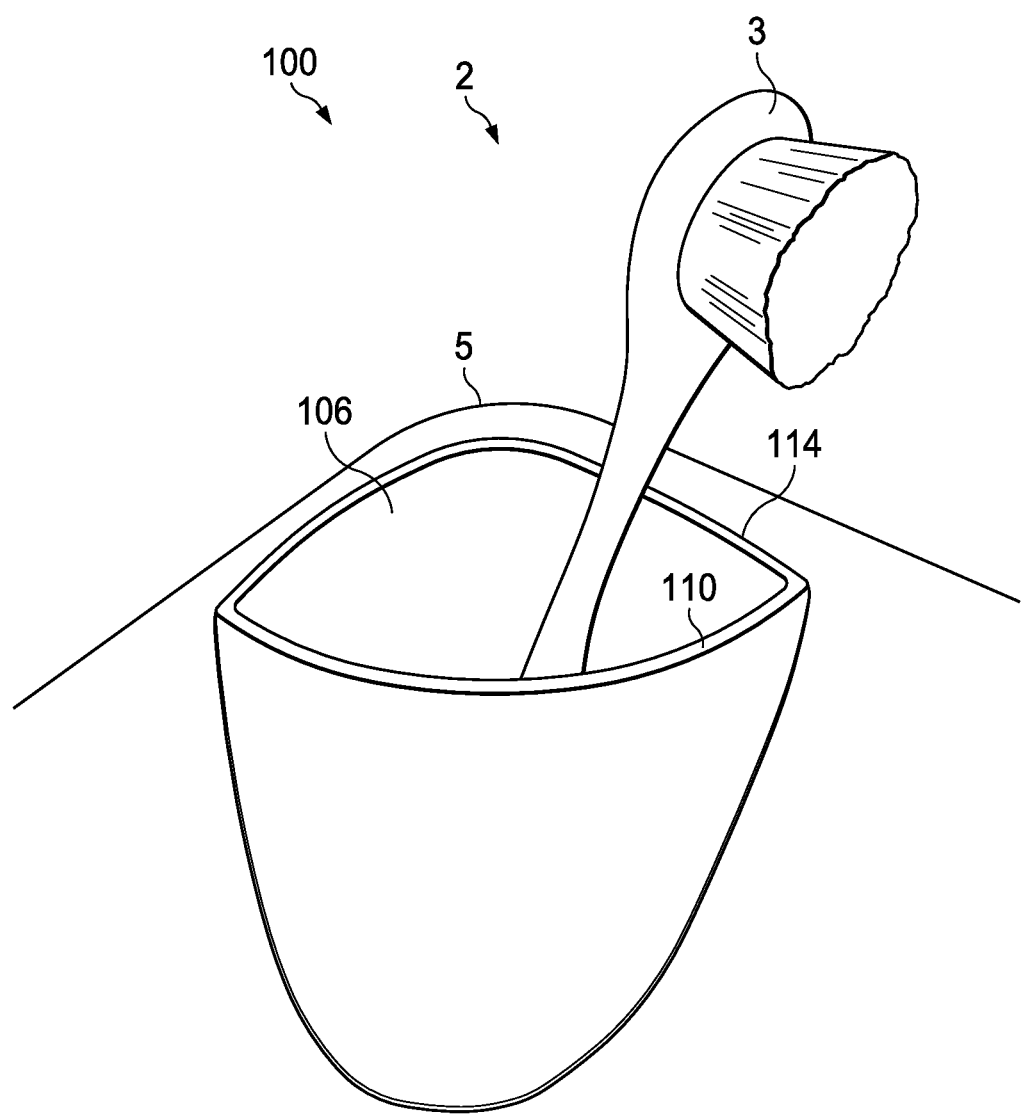
FIG. 2 is a diagram of a collapsible storage apparatus configured for installation in a corner of a sink and in use holding a stored article.
Figure 3:
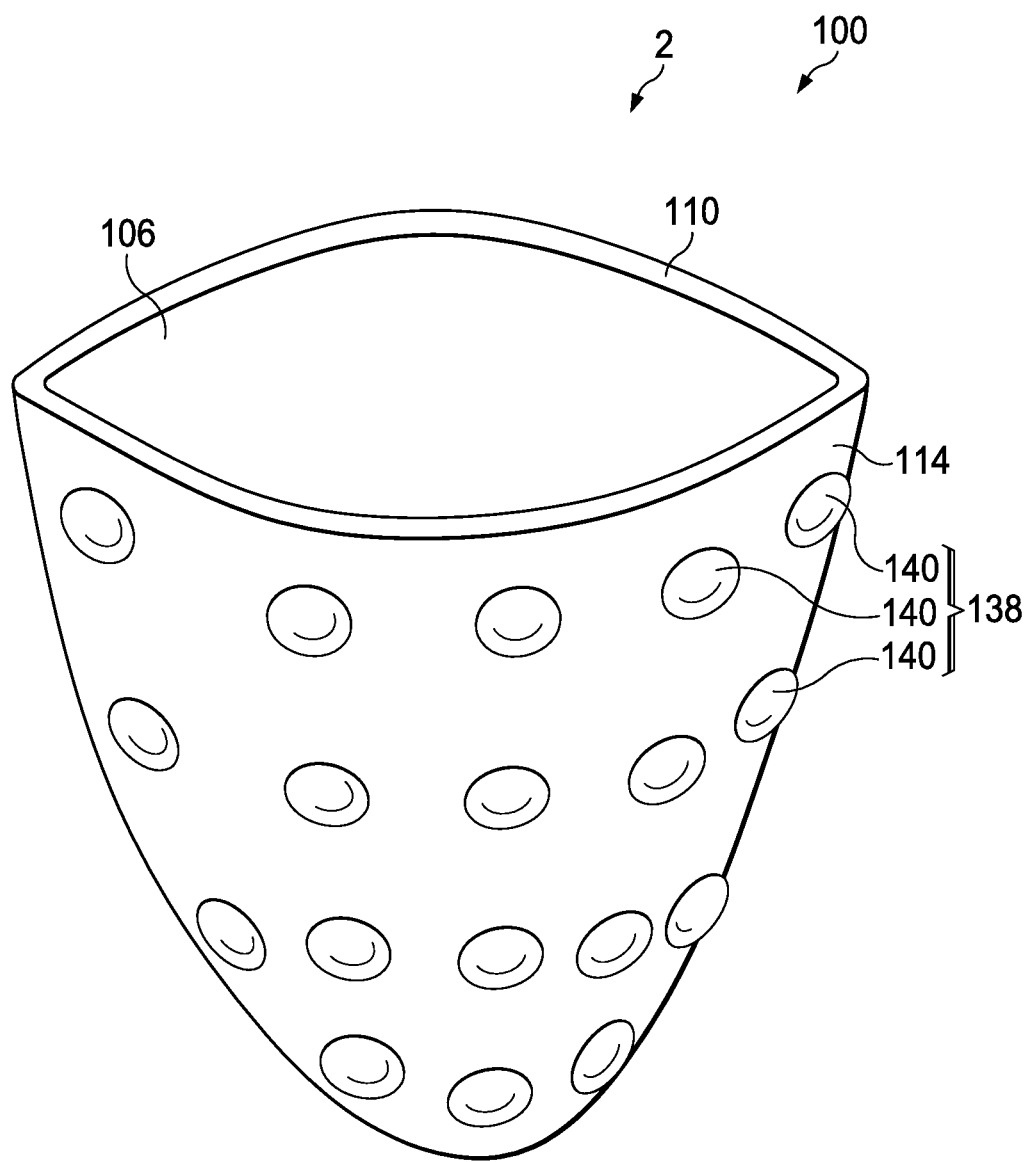
FIG. 3 is a diagram of a collapsible storage apparatus illustrating an embodiment of an attachment mechanism for attaching the apparatus to a sink.
Figure 4:
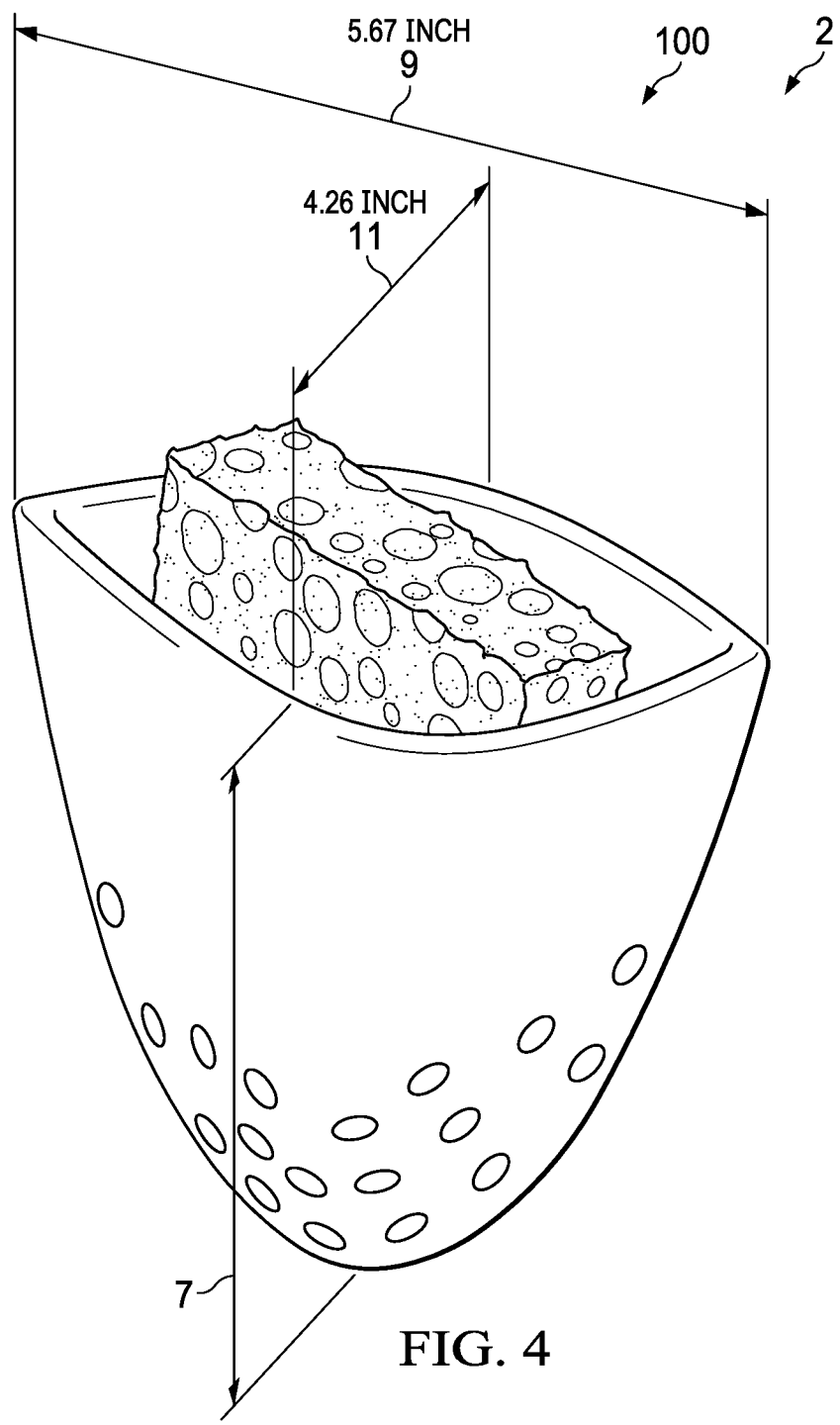
FIG. 4 is a diagram of a collapsible storage apparatus configured for installation in a corner of a sink and showing various dimensions.

According to the embodiment illustrated in FIGS. 1A and 1B, the drip accumulator 118 comprises a flared lip 126 extending upwardly from the upper end of the structural panel 116 and curving outwardly away from the structural panel 116 (and thus away from the draining cavity 106 wherein articles may be placed). In various instances, an article may extend outwardly beyond the profile of the draining cavity 106 and may drip liquid. For instance, droplets of water may run down the sides of an article as it dries. The drip accumulator 118 captures and redirects these drips into the draining cavity 106, rather than permitting them to run down the exterior face of the structural panel 116. In various embodiments, the drip accumulator 118 comprises a finger grippable tab whereby a user may selectably articulate or otherwise position the protruding wall portion 110 between the open and closed positions.

According to some embodiment, the drain panel 120 comprises a compoundly curved panel extending from the lower end of the structural panel 116 and attaching around at least a portion of its perimeter to the hinge portion 112. The drain panel 120 may be a separate panel attached or attachable to the lower end of the structural panel 116 and/or the hinge portion 112. In further embodiments, the drain panel 120 may be integrally formed with the structural panel 116 and/or the hinge portion 112. The drain panel 120 may have one or more apertures 128 extending from the draining cavity 106 and through the drain panel 120, permitting liquid to pass from the draining cavity 106 so that the article readily dries. The apertures 128 may be defined through the plane of the inward surface of the drain panel 120 and also through the plane of the outward surface of the drain panel 120. The apertures 128 may have a shape, and may be arranged in a pattern. For example, each aperture may comprise a circular aperture, oval aperture, a trapezoidal aperture, a slotted aperture, or any other shape as desired. Similarly, the apertures 128 may be arranged in a symmetric pattern, or an asymmetric pattern, or may be distributed to favor locations of liquid accumulation within draining cavity 106. The apertures 128 may also be shaped and arranged to facilitate airflow in order to enhance evaporative drying, thawing of frozen meat, and/or the like.

According to some embodiments, the rear wall portion 114 comprises a nesting panel 136 and an attachment mechanism 138. The nesting panel 136 comprises a resilient pliable material configured to retain an article within the draining cavity 106 and to provide support to the corner pocket storage apparatus 100 and the attachment mechanism 138 so that the attachment mechanism 138, when selectably mechanically affixed to a support such as a corner of a sink 5, the rear wall portion 114 has sufficient rigidity to hold the collapsible storage apparatus 2 in position during use. For instance, the nesting panel 136 may in various instances be a resilient non-pliable material, or may be a material relatively stiffer than the structural panel 116 of the protruding wall portion 110. The nesting panel 136 is bound at each side and the lower end by the hinge portion 112. Thus, the hinge portion 112 may form a continuous boundary around the edge of the nesting panel 136. Because the nesting panel 136 and/or structural panel 116 may have one or more curves and/or compound curves, the hinge portion 112 develops a bias toward at least one of the open and closed position of the storage apparatus 2. Consequently, the hinge portion 112 may comprise a continuous boundary around the edge of the nesting panel 136 having at least one compound curve, whereby the hinge portion 112 enables the structural panel 116 to be biased toward or away from the nesting panel 136. In this manner, the structural panel 116 may exhibit a snapping behavior so that the storage apparatus 2 is biased toward the open position when open and biased toward and remaining in a closed position when closed.

In various embodiments, the attachment mechanism 138 comprises one or more suction cups 140. In some embodiments, the suction cups 140 are integrally formed with the rear wall portion 114, for instance, in the nesting panel 136. In further embodiments, rear wall portion 114 may be configured such that the suction cups 140 are attachable to the rear wall portion 114, for instance, to the nesting panel 136. In various instances a plurality of suction cups 140 are arranged in a pattern configured to react to forces generated during use of the corner pocket storage apparatus 100. For example, the suction cups 140 may be arranged away from the apex of a curve of the nesting panel 136. The nesting panel 136 may be curved to correspond to the curvature of a corner of a sink 5, such that by arranging the suction cups 140 away from the apex (point of inflection) of the corner, the suction cups 140 encounter a relative more planar region of the sink 5 thereby improving suction. In further embodiments, the attachment mechanism 138 includes adhesive, frictional engagement, magnetic engagement, and/or the like in addition to or in lieu of the suction cups 140.

Finally, having discussed with particular detail the protruding wall portion 110 and the rear wall portion 114, attention is focused on the hinge portion 112 which joins the protruding wall portion 110 and the rear wall portion 114 together. Specifically, the hinge portion 112 may include a living hinge band 122. According to some embodiments, a living hinge band 122 may comprise a region of localized thinning, scoring, stippling, or change of material or material property. The region may extend in a band around at least a portion of the corner pocket storage apparatus 100, forming at least a portion of a boundary between the protruding wall portion 110 and the rear wall portion 114. In various instances, a plane sectioning the corner pocket storage apparatus 100 along the boundary of the protruding wall portion 110 and the rear wall portion 114 defines the path of the band. For instance, the living hinge band 122 may have a first side portion 130 extending along a side of the corner pocket storage apparatus 100, a longitudinal base portion 131 passing underneath the corner pocket storage apparatus 100, and have a second side portion 132 extending along an opposite side of the corner pocket storage apparatus 100 in a direction defined by a line (linear, bent, curved, or with a combination of such sections) that lies in the same plane as that of a similar line of the first side portion 130. Stated differently, the first side 130 and the second side 132 may follow parallel paths down the sides of the corner pocket storage apparatus. This path may be straight for a portion of the distance down the sides of the corner pocket storage apparatus, and may curve toward the nesting panel 136 of the rear wall portion proximate to the drain panel 120. This path may coincide with the joining of the structural panel 116 of the protruding wall portion 110 to the nesting panel 136 of the rear wall portion. The transitioning of the path from straight to curved may, for instance, advantageously provide for a compressive loading of a compound curve of the drain panel 120 during transition between open and closed configurations in order to impel a portion of the protruding wall portion 110 and portion of the rear wall portion 114 to bias toward or away from each other.

Having now discussed each structural component of the corner pocket storage apparatus 100, certain dimensions and spatial relationships of structural components to each other are further elaborated. Referring back to FIGS. 1A, 1B and FIGS. 5A and 5B, the structural panel 116 may define a structural panel angle 124. A structural panel angle 124 may comprise an angle between the structural panel 116 of the protruding wall portion 110 when the corner pocket storage apparatus 100 is in an open configuration ready for receiving articles into the draining cavity 106 and the nesting panel 136 of the rear wall portion 114. Specifically, the angle may be measured two lines. One such line may be a structural panel line 54 lying along the surface of the structural panel 116 at a position farthest from nesting panel 136. For instance, this line may lie along a point of inflection of the surface of the structural panel 116. The other such line may be a nesting panel line 52 lying along the surface of the nesting panel 136 at a position farthest from the structural panel 116.

The hinge portion 112 may also define a hinge portion angle 134. The hinge portion angle 134 may comprise an angle between a substantial portion of the living hinge band 122 of the hinge portion 112 and the nesting panel 136 of the rear wall portion 114. Specifically, the angle may be measured by two lines. One such line may be a hinge line 50 bisecting a substantial portion of the first side 130 of the living hinge band 122 of the hinge portion 112, and the second side 132 of the living hinge band 122 of the hinge portion 112. The other such line may be a nesting panel line 52 extending along the surface off the nesting panel 136 at a position farthest from the structural panel 116.

In various embodiments, the hinge portion angle 134 is greater than 50% of the structural panel angle 124. This may encourage the corner pocket storage apparatus 100 to bias toward a closed position more readily than an open position. In various embodiments, the hinge portion angle 134 is 50% of the structural panel angle 124. This may encourage the corner pocket storage apparatus 100 to bias toward a closed position when closed and an open position when open with substantially equal preference. In various embodiments, the hinge portion angle 134 is less than 50% of the structural panel angle 124. This may encourage the corner pocket storage apparatus 100 to bias toward an open position more readily than a closed position. In further embodiments, various angles, curvatures, and dimensions may be selected to impel various bias behaviors as desired.

Embodiments of the corner pocket storage apparatus 100 may have particular dimensions. A few non-limiting examples are provided. Specifically, with specific reference to FIGS. 4, 5A, and 5B, the corner pocket storage apparatus 100 has dimensions comprising a height 7, width 9, length 11, and thickness 13. For instance, a height 7 may comprise a distance from a distal end of the drain panel 120 to a distal end of the drip accumulator 118. A width 9 may comprise a distance defined between co-planar points of the hinge portion 112, such as from a first side 130 of the living hinge band 122 at to a second side 132 of the living hinge band 122. A length 11 may comprise a distance between the structural panel 116 and the nesting panel 136, when in the open configuration and a thickness 13 may comprise the distance between the structural panel 116 and the nesting panel 136, when in the closed configuration. As such, in various embodiments, the length 11 may comprise a distance between 4 inches (10.16 cm) and 5 inches (12.7 cm). For example, the length 11 may comprise 4.26 inches (10.82 cm). The width 9 may comprise a distance between 5 inches (12.7 cm) and 6 inches (15.24 cm). For instance, the width 9 may comprise 5.67 inches (14.4 cm). The thickness 13 may comprise a distance of 1/16 inch (1.5875 mm) to 1/4 inch (6.35 mm). For instance, the thickness 13 may comprise 1/8 inch (3.175 mm). It should be understood, however, that the height 7, the width 9, the length 11, and the thickness 13 may be any suitable value.

Side Pocket Storage Apparatus

With reference to FIGS. 6-10, a collapsible storage apparatus 2 comprises a side pocket storage apparatus 200. In various embodiments, the side pocket storage apparatus 200 comprises a protruding wall portion 110 joined to a rear wall portion 114 by a hinge portion 112. A protruding wall portion 110 may extend away from the surface to which the side pocket storage apparatus 200 is selectably attached. A rear wall portion 114 may be oriented proximate to the surface to which the side pocket storage apparatus 200 is selectably attached. For instance, referring specifically to FIG. 2, a protruding wall portion 110 may extend away from the surface of the corner area of a sink 5 to which the side pocket storage apparatus 200 is selectably attached. Similarly, a rear wall portion 114 may be oriented proximate to the surface of the corner area of the sink 5 to which the side pocket storage apparatus 200 is selectably attached. Thus, the protruding wall portion is opposing the rear wall portion. With momentary reference to FIG. 9, one may see that the protruding wall portion 110 may be selectably moved from an open, or protruding position to a closed, or stored position by operation of the hinge portion 112.

According to some embodiments, the protruding wall portion 110 comprises a resilient and at least partially pliable structure configured to retain an article within the draining cavity 106. In various embodiments the protruding wall portion 110 comprises a planar sheet. In various embodiments, the planar sheet is a flat plane, while in other embodiments the planar sheet has been curved to no longer be planar. In further embodiments, the protruding wall portion 110 comprises a compoundly curved sheet. Moreover, the protruding wall portion 110 may have a first protruding wall material stiffness.

According to some embodiments, the rear wall portion 114 comprises a resilient and at least partially pliable material configured to retain an article within the draining cavity 106. In various embodiments the rear wall portion 114 comprises a planar sheet. The planar sheet may be a flat plane, such as may coincide with the sink side 15 to which it is proximate. The planar sheet may alternatively be curved so that it is no longer planar. In further embodiments, the rear wall portion 114 comprises a compoundly curved sheet. Moreover, the rear wall portion 114 may have a first rear wall material stiffness.

The hinge portion 112 may comprise a resilient and at least partially pliable material joining the protruding wall portion 110 to the rear wall portion 114 and enabling relative movement of the protruding wall portion 110 relative to the rear wall portion 114. In various embodiments, the hinge portion 112 has a first hinge portion material stiffness. In various instances, the first hinge portion material stiffness is less (e.g., more pliable) than the first protruding wall material stiffness. In further embodiments, the first hinge portion material stiffness is the same and/or greater than (e.g., less pliable) than the first protruding wall material stiffness. However, the hinge portion 112 may include scoring, bending, localized thinning, stippling, and/or force concentrating features, whereby the hinge portion 112 is operable so that the protruding wall portion 110 articulates relative to the rear wall portion 114.

Turning now with detailed reference to the protruding wall portion 110 introduced above, the protruding wall portion 110 may comprise a structural panel 116, a pull tab 202 and a drain panel 120. The structural panel 116 comprises a resilient pliable material configured to retain an article within the draining cavity 106. The structural panel 116 is bound at each side by the hinge portion 112, connecting thereto, and bound at a lower end by a drain panel 120, and open at the upper end, with the pull tab 202 extending from the upper end of the structural panel 116. In various embodiments, the structural panel 116 provides structural rigidity to the protruding wall portion 110.

Figure 6:
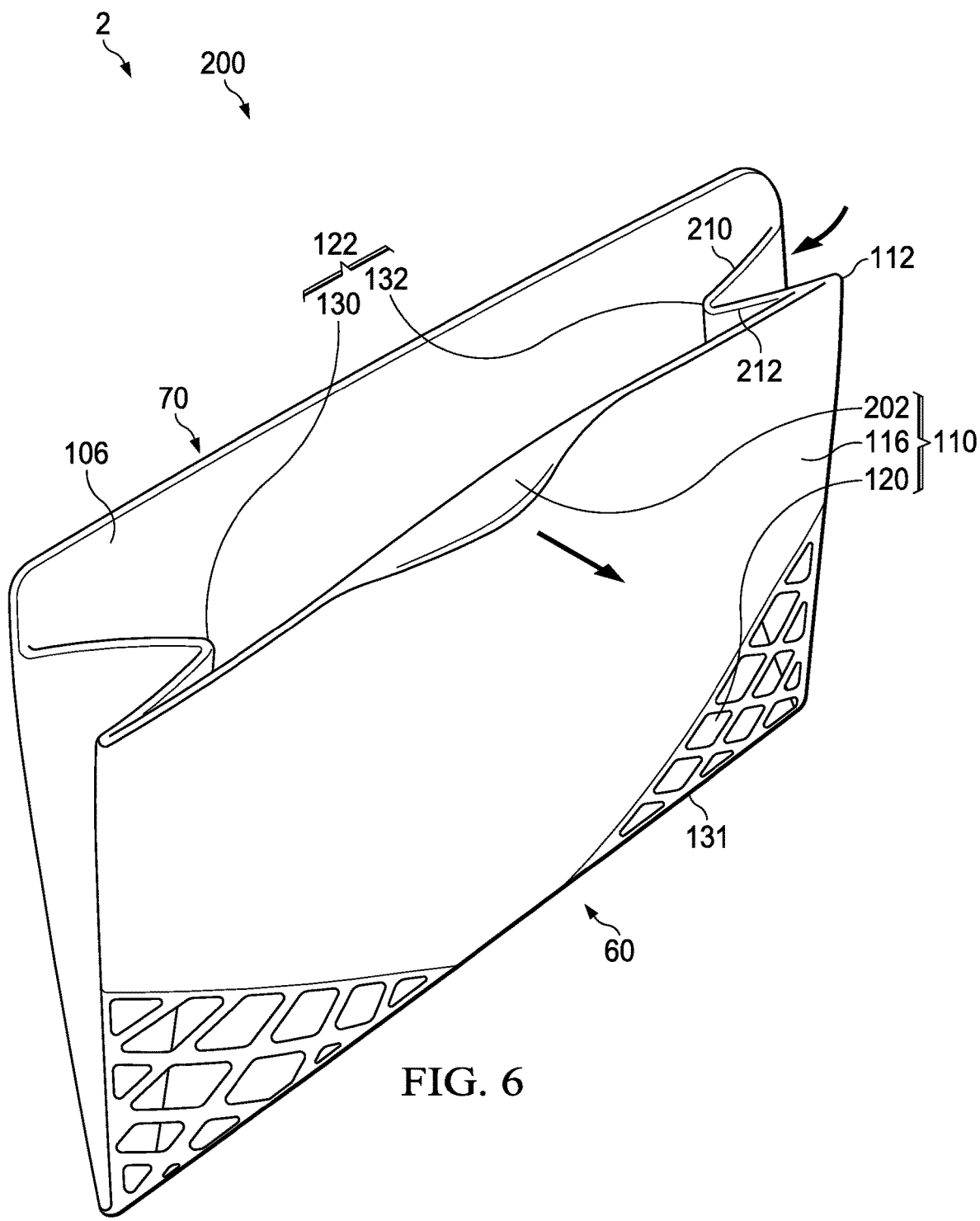
FIGS. 6-7 are diagrams of another embodiment of a collapsible storage apparatus configured for installation against a side of a sink.
Figure 7:
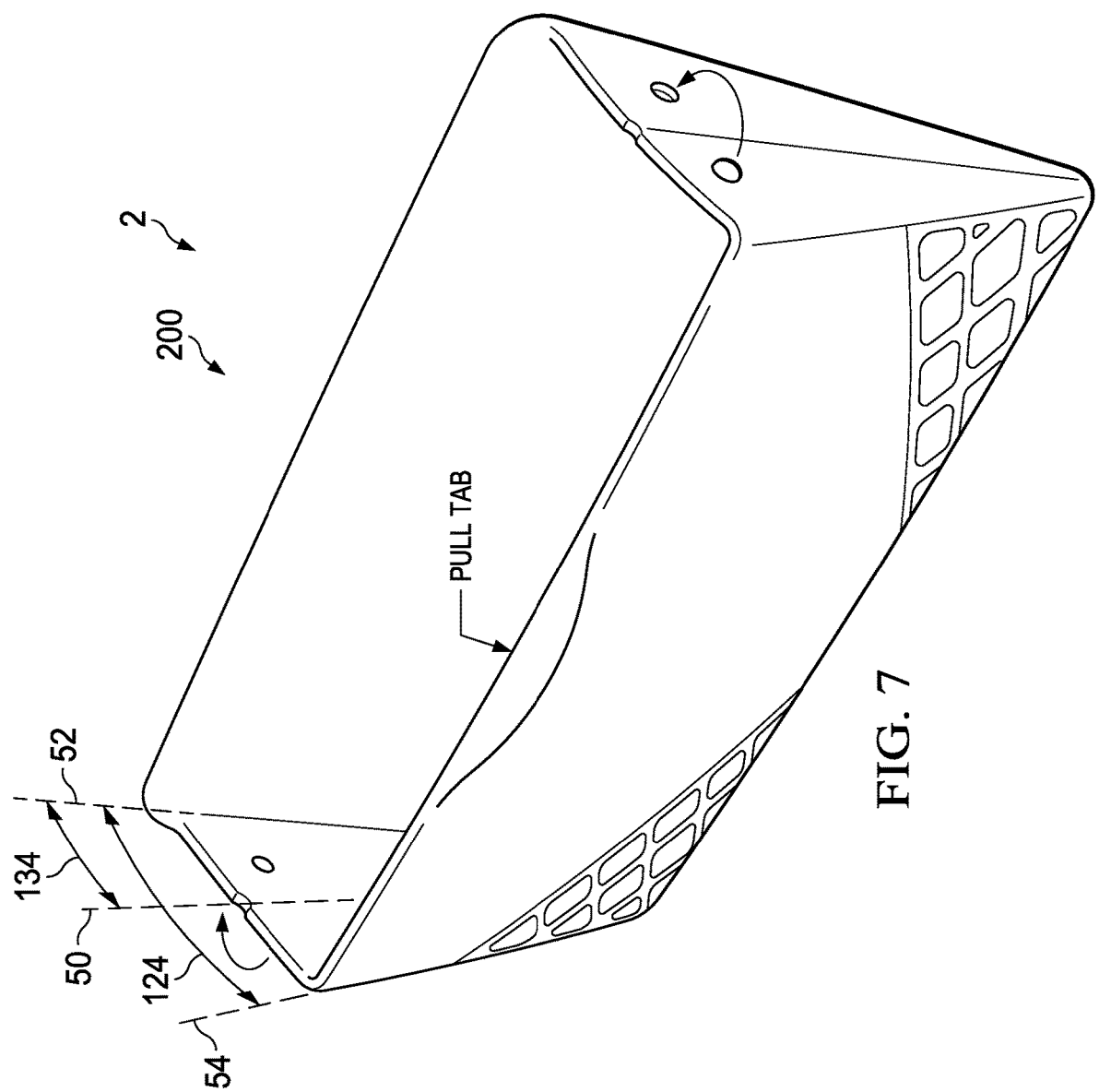
Figure 8:
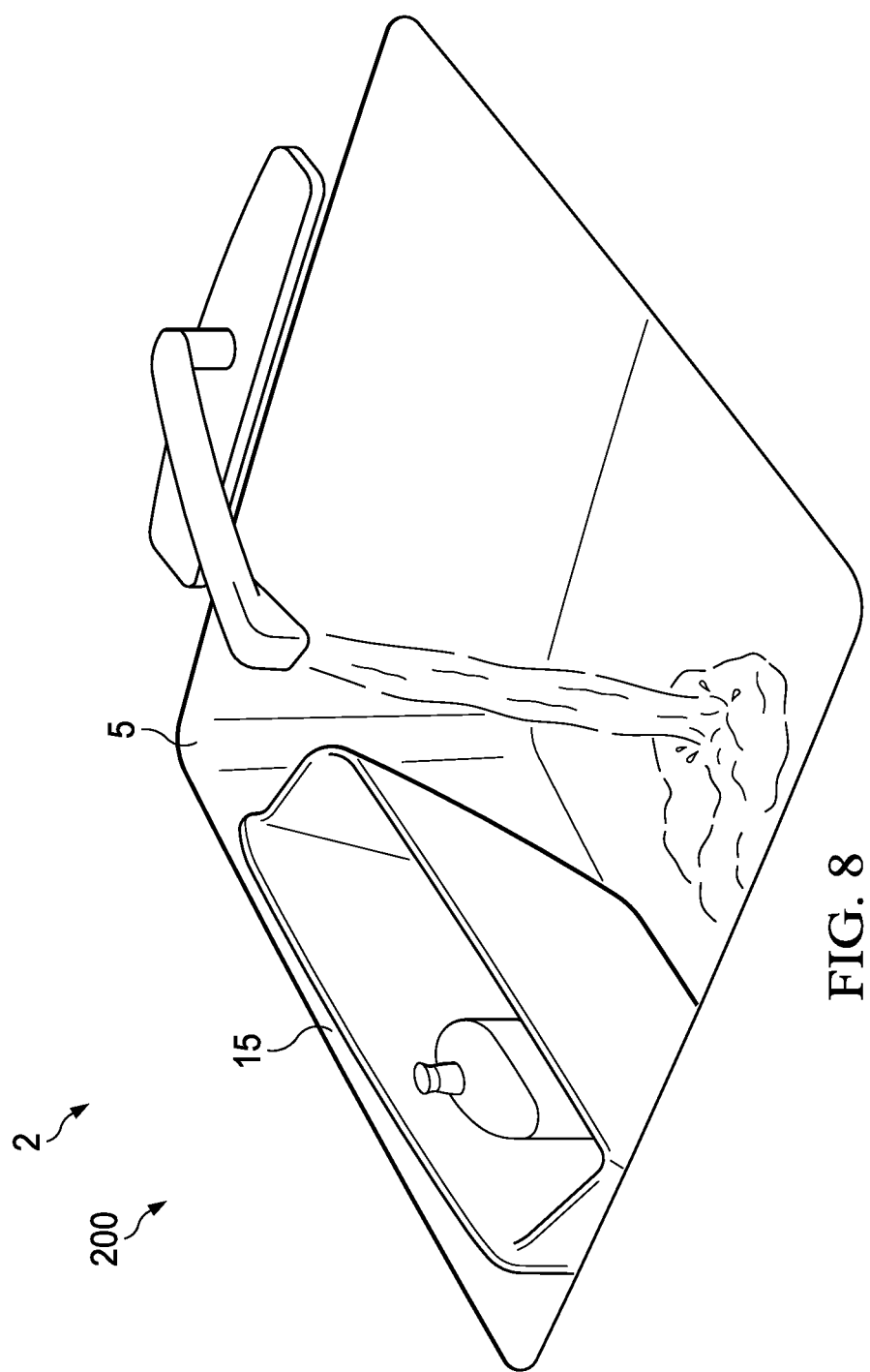
FIG. 8 is a diagram of the collapsible storage apparatus installed against a side of the sink depicting.

In the embodiment illustrated in FIG. 6, for example, the pull tab 202 comprises a flange like extension outwardly from the structure panel 116. The pull tab 202 may be finger grippable tab whereby a user may selectably articulate the protruding wall portion 110 between the open and stored positions. The pull tab 202 may be unitary with the protruding wall portion 110, or it may be joined to the protruding wall portion 110. In various embodiments, the pull tab comprises a region of localized stiffening, whereby the pulling action used to transition the side pocket 200 from a closed to open position may be more resiliently endured over time.

The drain panel 120 may comprise a panel extending from at least a portion of the lower end of the structural panel 116. The drain panel 120 may be a separate panel attached or attachable to the lower end of the structural panel 116 and/or to the hinge portion 112. In further embodiments, the drain panel 120 may be integrally formed with the structural panel 116 and/or the hinge portion 112. The drain panel 120 may have one or more apertures 128 extending from the draining cavity 106 and through the drain panel 120, permitting liquid to pass from the draining cavity 106 so that the article readily dries. The apertures 128 may be defined through the plane of the inward surface of the drain panel 120 and also through the plane of the outward surface of the drain panel 120. The apertures 128 may have a shape, and may be arranged in a pattern. For example, each aperture may comprise a circular aperture, oval aperture, a trapezoidal aperture, a slotted aperture, or any other shape as desired. Similarly, the apertures 128 may be arranged in a symmetric pattern, or an asymmetric pattern, or may be distributed to favor locations of liquid accumulation within draining cavity 106. The apertures 128 may also be shaped and arranged to facilitate airflow in order to enhance evaporative drying, thawing of frozen meat, and/or the like. In various embodiments, the apertures are arranged into a first aperture set 204-1 and a second aperture set 204-2. Each of first aperture set 204-1 and second aperture set 204-2 may comprise apertures arranged in a triangular arrangement and proximate to opposite lower edge corners of the drain panel 120, however, other configurations are also applicable.

Shifting focus from the protruding wall portion 110 to the rear wall portion 114, the rear wall portion 114 may comprise a nesting panel 136 and an attachment mechanism 138. The nesting panel 136 comprises a resilient pliable material configured to retain an article within the draining cavity 106 and to provide support to the side pocket storage apparatus 200 and the attachment mechanism 138 so that the attachment mechanism 138, when selectably mechanically affixed to a support such as a side of a sink 15, the rear wall portion 114 has sufficient rigidity to hold the collapsible storage apparatus 2 in position during use. For instance, the nesting panel 136 may in various instances be a resilient non-pliable material, or may be a material relatively stiffer than the structural panel 116 of the protruding wall portion 110. The nesting panel 136 is bound at each side and the lower end by the hinge portion 112. Thus, the hinge portion 112 may form a first accordion section 130 along a first boundary edge of the nesting panel 136 and a second accordion section 132 along a second boundary edge of the nesting panel 136 that is opposite the first boundary edge. Because the first accordion section 130 and the second accordion section 132 may have a bias toward the open position of the storage apparatus 2, magnets 142 may be positioned at positions along the hinge portion 112 in order to induce in the hinge portion 112 a snapping behavior. In this manner, the hinge portion 112 may exhibit a snapping behavior, so that the storage apparatus 2 is biased toward remaining in an open position when open, and biased toward remaining in a closed position when closed.

In various embodiments the attachment mechanism 138 comprises one or more suction cups 140. Suction cups 140 may be integrally formed with the rear wall portion 114, for instance in the nesting panel 136. In further embodiments, rear wall portion 114 may be connectorized such that suction cups 140 are attachable to the rear wall portion 114, for instance, to the nesting panel 136. In various instances a plurality of suction cups 140 are arranged in a pattern configured to react or otherwise counteract forces arising during use of the side pocket storage apparatus 200. For instance, suction cups 140 may be arranged at the corners of the nesting panel 136. The nesting panel 136 may be flat to correspond to the side of a sink 15. In further embodiments, the attachment mechanism 138 may include adhesive, frictional engagement, magnetic engagement, and/or the like in addition to or in lieu of suction cups 140.

Finally, having discussed with particular detail the protruding wall portion 110 and the rear wall portion 114, attention is focused on the hinge portion 112 which joins the protruding wall portion 110 and the rear wall portion 114 together. Specifically, the hinge portion 112 may include a living hinge band 122. A living hinge band 122 may comprise a region of localized thinning, scoring, stippling, accordioning of material, or change of material or material property. The region may extend in a band along at least a portion of the side pocket storage apparatus 200, forming at least a portion of a boundary between the protruding wall portion 110 and the rear wall portion 114. In various instances, a plane sectioning the side pocket storage apparatus 200 along the boundary of the protruding wall portion 110 and the rear wall portion 114 defines the path of the band. For instance, the living hinge band 122 may have a first side portion 130 extending along a side of the side pocket storage apparatus 200 in a direction along a side of the side pocket storage apparatus 200 from the upper opening 70 of the side pocket storage apparatus 200 to the bottom end 60 of the side pocket storage apparatus 200, and may have a second side portion 132 extending along an opposite side of the side pocket storage apparatus 200 in similar or same direction. The living hinge band 122 may also have a longitudinal base portion 131 extending along the bottom end 60 of the side pocket storage apparatus 200 and extending between the first side portion 130 and the second side portion 132. The first side 130, the second side 132, and the bottom portion may lie in a shared plane. For instance, the first side 130 and the second side 132 may both lie in a shared plane along the joining of the structural panel 116 of the protruding wall portion 110 to the nesting panel 136 of the rear wall portion 114. The longitudinal base portion 131 may lie in the same plane.

The first side 130 may comprise an accordion structure having a first side inward collapsible flap 206 and a first side outward collapsible flap 208. In further embodiments, any number of flaps may be contemplated. The rear wall portion 114 joins along an edge to the first side inward collapsible flap 206, and the protruding wall portion joins along an edge to the first side outward collapsible flap 208. The first side inward collapsible flap 206 joins to the first side outward collapsible flap 208 at an edge opposite the rear wall portion 114. Thus, correspondingly, one may say that the first side outward collapsible flap 208 joins to the first side inward collapsible flap 206 at an edge opposite the protruding wall portion 110. At each point of joining, the flaps are articulable relative to at least one of the rear wall portion 114 and the protruding wall portion 110 so that the flaps overlap in an accordion-style when the side pocket 200 is closed and unfurl in an accordion-style when the side pocket 200 is open.

The second side 132 may also comprise an accordion structure which may have a second side inward collapsible flap 210 and a second side outward collapsible flap 212. In further embodiments, any number of flaps may be contemplated. The rear wall portion 114 joins along an edge to the second side inward collapsible flap 210, and the protruding wall portion joins along an edge to the second side outward collapsible flap 212. The second side inward collapsible flap 210 joins to the second side outward collapsible flap 212 at an edge opposite the rear wall portion 114. Thus, correspondingly, one may say that the second side outward collapsible flap 212 joins to the second side inward collapsible flap 210 at an edge opposite the protruding wall portion 110. At each point of joining, the flaps are articulable relative to at least one of the rear wall portion 114 and the protruding wall portion 110 so that the flaps overlap in an accordion-style when the side pocket 200 is closed and unfurl in an accordion-style when the side pocket 200 is open. The dimensions of the first side inward collapsible flap 206, first side outward collapsible flap 208, second side inward collapsible flap 210, and second side outward collapsible flap 212 may be chosen to impel different bias behaviors toward open or closed, or to impel asymmetric opening or closing, as desired.

While in various embodiments the longitudinal base portion 131 may also comprise an accordion structure; in further embodiments the longitudinal base portion 131 comprises a flexible intersection of the rear wall portion 114 with the protruding wall portion 110.

Figure 9:
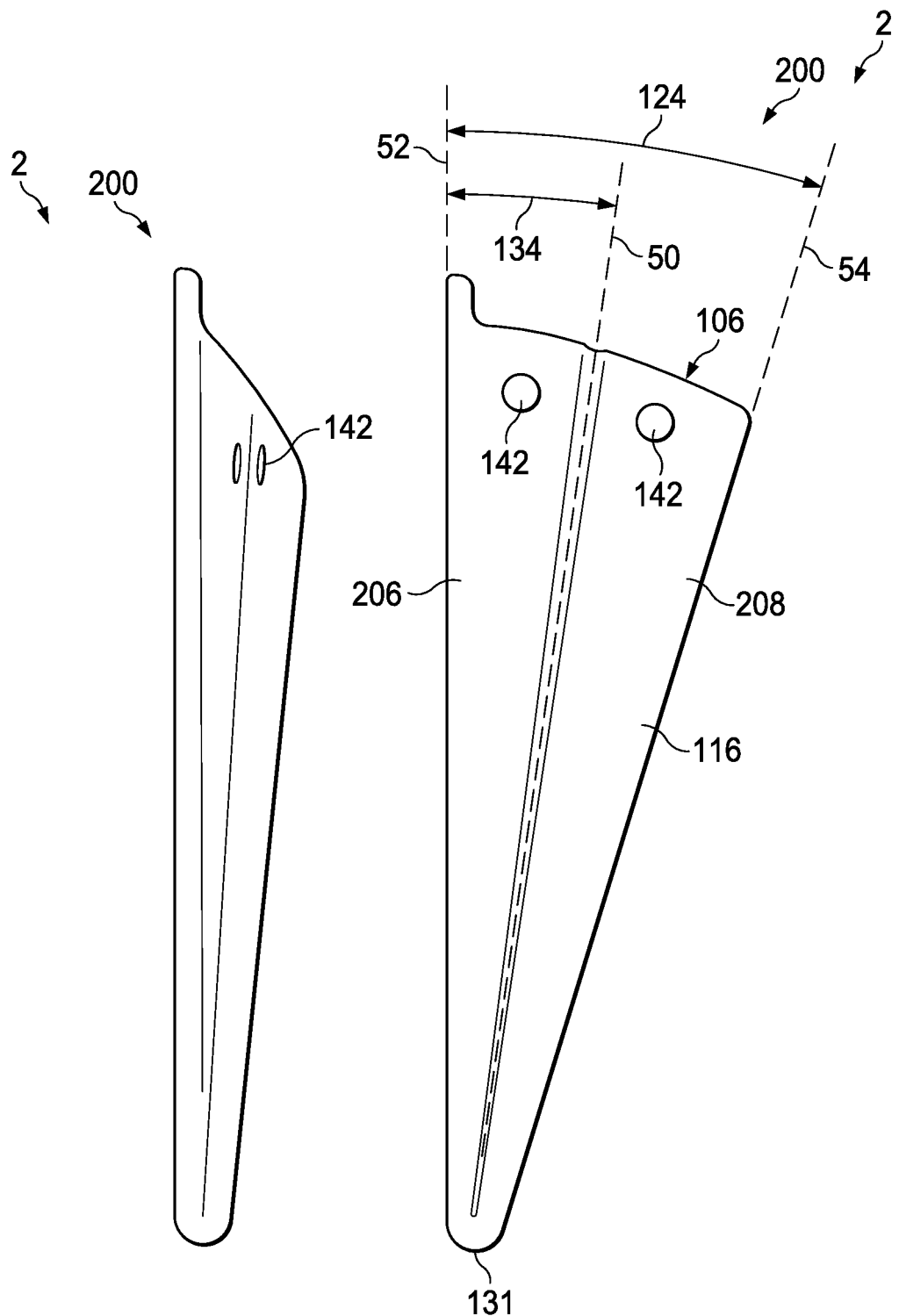
FIG. 9 is a diagram of the collapsible storage apparatus of FIG. 8 illustrated in the stored and use positions respectively.
Figure 10:
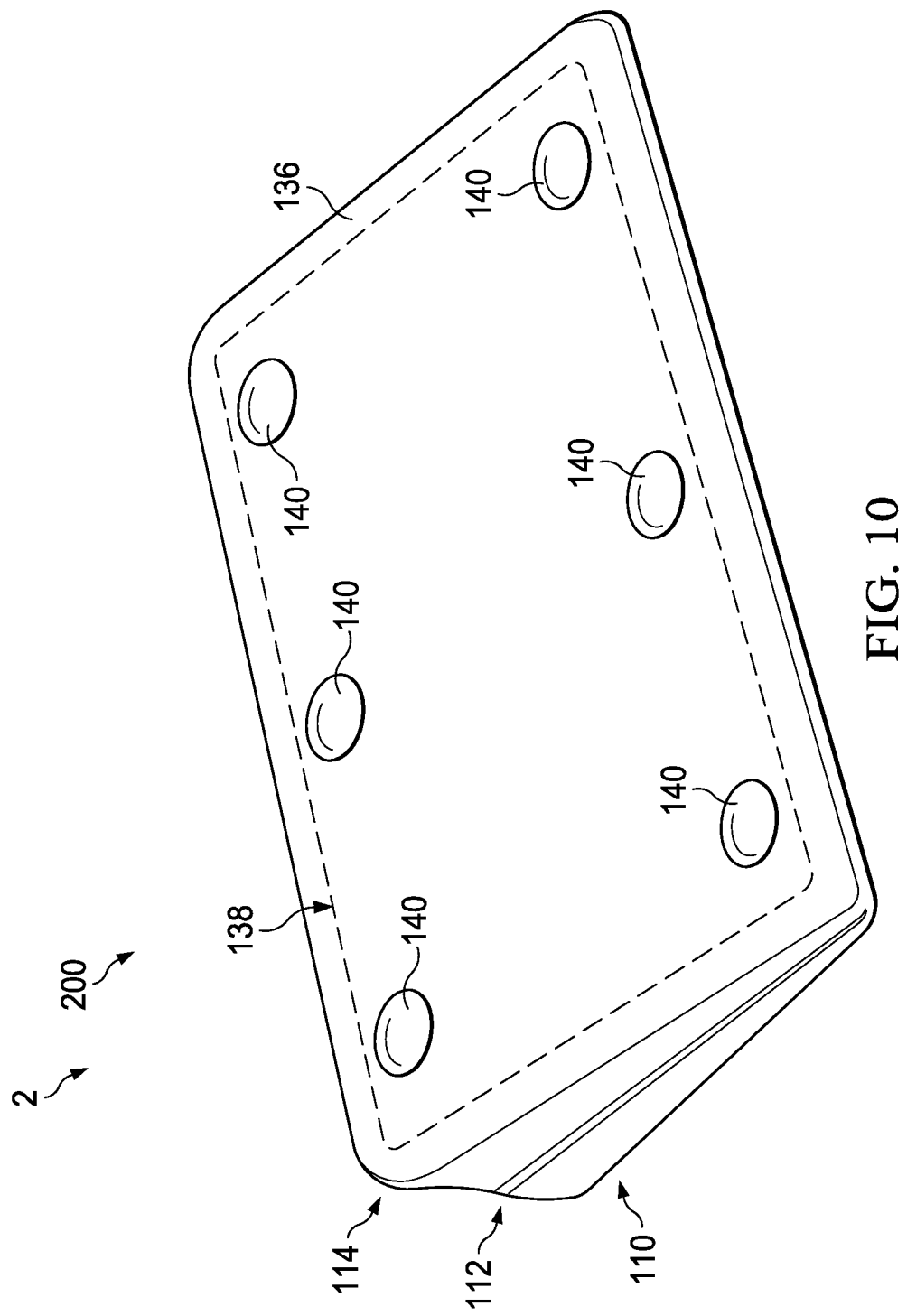
FIG. 10 is a rear view of the collapsible storage apparatus of FIG. 8 illustrating an attachment mechanism.

In various instances, a magnet-ferromagnetic material pair, or a magnet-magnet pair may be associated with the first side 130 and/or the second side 132 of the living hinge band 122. As depicted in FIG. 9, a magnetic closure member 142 such as a ferromagnetic material or magnet may be emplaced on first side inward collapsible flap 206 and a reciprocal magnetic closure member 142 may be emplaced on the first side outward collapsible flap 208 to selectably mate to that on the first side inward collapsible flap. Thus, the side pocket 200 may be selectably biased toward a closed position. With reference to FIGS. 6-10, and particularly, to FIGS. 6 and 9, a similar structure may be emplaced on the second side inward collapsible flap 210 and second side outward collapsible flap 212 with similar functionality.

Having now discussed each structural component of the side pocket storage apparatus 200, certain dimensions and spatial relationships of structural components to each other are further elaborated. With special emphasis on FIG. 9, the structural panel 116 may define a structural panel angle 124. A structural panel angle 124 may comprise an angle between the structural panel 116 of the protruding wall portion 110 when the side pocket storage apparatus 200 is in an open configuration ready for receiving articles into the draining cavity 106 and the nesting panel 136 of the rear wall portion 114. Specifically, the angle may be measured by two lines. One such line may be a structural panel line 54 lying along the surface of the structural panel 116 at a position farthest from nesting panel 136. For instance, this line may lie along a front face of the structural panel 116. The other such line may be a nesting panel line 52 lying along the surface of the nesting panel 136 at a position farthest from the structural panel 116.

The hinge portion 112 may also define a hinge portion angle 134. The hinge portion angle 134 may comprise an angle between a substantial portion of the living hinge band 122 of the hinge portion 112 and the nesting panel 136 of the rear wall portion 114. Specifically, the angle may be measured by two lines. One such line may be a hinge line 50 lying along a plane bisecting a substantial portion of the first side 130 of the living hinge band 122 of the hinge portion 112, and the second side 132 of the living hinge band 122 of the hinge portion 112. More specifically, the plane (and thus hinge line 50) may bisect the intersection of the first side inward collapsible flap 206 with the first side outward collapsible flap 208, as well as bisecting the intersection of the second side inward collapsible flap 210 with the second side outward collapsible flap 212. The other such line may be a nesting panel line 52 lying along the surface of the nesting panel 136 at a position farthest from the structural panel 116.

In various embodiments, the hinge portion angle 134 is greater than 50% of the structural panel angle 124. This may encourage the side pocket storage apparatus 200 to bias toward an open position more readily than otherwise. In various embodiments, the hinge portion angle 134 is 50% of the structural panel angle 124. In various embodiments, the hinge portion angle 134 is less than 50% of the structural panel angle 124. In further embodiments, various angles, curvatures, and dimensions may be selected to impel various bias behaviors as desired. Furthermore, as mentioned magnets 142 may be emplaced to further control bias behavior.

Center Pocket Storage Apparatus

As discussed above with reference to FIGS. 11-13 and FIGS. 6-10, a collapsible storage apparatus 2 may comprise a center pocket storage apparatus 300. A center pocket storage apparatus 300 may comprise a first side pocket storage apparatus 200-1 and a second side pocket storage apparatus 200-2 joined together by a saddle 302 which supports the center pocket storage apparatus 300 on the cross member 25 and straddling the cross member 25 of the sink, basin, or the like.

A saddle 302 may comprise a first hanging panel 304, a second hanging panel 306, and a connective web 308. The connective web 308 may comprise a resilient panel that rests on the cross member 25 of the sink, basin, or the like, and provides structural support. The connective web 308 may extend across the cross member from one side to another, bridging the adjacent basins of the sink. The connective web 308 may, at each basin, connect to a downwardly extending panel that allows an associated pocket storage apparatus to hang at least partially within the basin. For example, a first hanging panel 304 may extend from the connective web 308 into a basin area of the sink and connect the first side pocket storage apparatus 200-1 to the connective web 308. Similarly, a second hanging panel 306 may extend from the connective web 308 into a basin area of the sink and connect the second side pocket storage apparatus 200-2 to the connective web 308.

In still further instances, a center pocket storage apparatus 300 may have a single side pocket storage apparatus 200 on only one side of the cross member 25 of the sink, basin, or the like, and the saddle 302 may support center pocket storage apparatus 300 on the cross member.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and "right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A collapsible storage apparatus comprising:
    a protruding wall portion and an opposed rear wall portion, the protruding wall portion movable between an open position in which the protruding wall portion is spaced apart from the opposed rear wall portion to enable the apparatus to receive items within a drain cavity formed by the protruding wall portion and the opposed rear wall portion, and a stored position, in which the protruding wall portion is collapsed and positioned toward the opposed rear wall; and
    a hinge hingedly joining the rear wall portion to the protruding wall portion, the hinge forming a continuous boundary along the entire length of the respective edges of the protruding wall portion and the opposed rear wall portion to enable the protruding wall portion to snap over-center from a convex configuration in the open position, to a concave configuration when in the stored positions.

2. The apparatus of claim 1, further comprising at least one suction cup disposed on the rear wall portion to attach the rear wall to a sink.

3. The apparatus of claim 1; wherein the protruding wall portion includes at least one drain opening.

4. The apparatus of claim 1, wherein the rear wall portion is curved.

5. The apparatus of claim 1, wherein the protruding wall portion includes a flared lip extending therefrom.

6. A collapsible storage apparatus comprising:
    a concave shaped protruding wall portion coupled to an opposed convex shaped rear wall portion via a hinge, the hinge forming a continuous boundary along the entire length of the respective edges of the protruding wall portion and the opposed rear wall portion, the protruding wall portion movable between an open position in which the protruding wall portion is spaced apart from the opposed rear wall portion to enable the apparatus to receive items within a drain cavity formed by the protruding wall portion and the opposed rear wall portion, and a stored position, in which the protruding wall portion is collapsed and positioned toward the opposed rear wall; and
    the protruding wall portion secured to the hinge and movable to snap over-center when configured between the open and stored positions.

7. The apparatus of claim 6, wherein the protruding wall portion is formed of the same material as the rear wall portion.

8. The apparatus of claim 6, wherein the hinge is formed by one of either scoring, bending, localized thinning, stippling and force concentrating features.

9. The apparatus of claim 6, wherein the protruding wall portion includes a drain panel having openings formed therethrough.

10. The apparatus of claim 9, wherein the drain panel is integrally formed with the protruding wall portion.

11. The apparatus of claim 6, wherein when the protruding wall portion is in the open position, the protruding wall portion is biased apart from the rear wall portion.

12. The apparatus of claim 6, wherein when the protruding wall portion is in the collapsed position, the protruding wall portion is biased toward the rear wall portion.

13. The apparatus of claim 6, wherein the rear wall is flexible and conforms to the shape of the sink sidewall.

* * * * *